US012675547B2

(12) United States Patent
Sheth et al.

(10) Patent No.: US 12,675,547 B2
(45) Date of Patent: Jul. 7, 2026

(54) METHODS AND SYSTEMS FOR RESERVOIR SIMULATION

(71) Applicant: SCHLUMBERGER TECHNOLOGY CORPORATION, Sugar Land, TX (US)

(72) Inventors: Soham Sheth, Abingdon (GB); Tom Jonsthovel, Asker (NO)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 1016 days.

(21) Appl. No.: 17/759,044

(22) PCT Filed: Jan. 19, 2021

(86) PCT No.: PCT/US2021/013859
§ 371 (c)(1),
(2) Date: Jul. 19, 2022

(87) PCT Pub. No.: WO2021/150468
PCT Pub. Date: Jul. 29, 2021

(65) Prior Publication Data
US 2023/0351078 A1      Nov. 2, 2023

Related U.S. Application Data

(60) Provisional application No. 62/963,522, filed on Jan. 20, 2020.

(51) Int. Cl.
| *G06F 17/11* | (2006.01) |
| *G06F 111/10* | (2020.01) |
| *G06F 113/08* | (2020.01) |

(52) U.S. Cl.
CPC ........... *G06F 17/11* (2013.01); *G06F 2111/10* (2020.01); *G06F 2113/08* (2020.01)

(58) Field of Classification Search
CPC ...... G06F 17/11; G06F 30/28; G06F 2113/08; G06F 2111/00–2111/20; G06F 30/00;
(Continued)

(56) References Cited

U.S. PATENT DOCUMENTS

| 9,708,899 B2 | 7/2017 | Prange et al. |
| 9,816,353 B2 | 11/2017 | Rashid et al. |

(Continued)

FOREIGN PATENT DOCUMENTS

| WO | 2007027222 A2 | 3/2007 |
| WO | 2017151838 A1 | 9/2017 |

OTHER PUBLICATIONS

Sheth_2019 (Inexact Newton Method for General Purpose Reservoir Simulation, Geoscience Research Center, Total E&P UI, Westhill, Dec. 13, 2019) (Year: 2019).*
(Continued)

*Primary Examiner* — Brian S Cook
(74) *Attorney, Agent, or Firm* — Kyle R. Miiller

(57) ABSTRACT

An improved reservoir simulator is provided that determines variable convergence criteria used in newton iterations in in a manner that addresses the problem of oversolving while minimizing the adverse effect on the nonlinear system. In the improved reservoir simulator, nonlinear information along with some information from the linear system can be used to determine a variable convergence tolerance. The variable convergeance tolerance can be used to define the variable convergence criteria used in newton iterations performed by the reservoir simulator.

12 Claims, 7 Drawing Sheets

(58) Field of Classification Search

CPC .......... G06F 30/17; G06F 30/18; G06F 30/20;
G06F 30/23; G06F 30/30; G06F 30/327;
G06F 30/33; G06F 30/3312; G06F 30/34;
G06F 30/36; G06F 30/39; G06F 30/392;
G06F 30/394; G06N 3/0442; G06N 3/09;
G06N 3/044; G06N 5/01; G06N 20/20;
G06N 3/08; E21B 2200/20

USPC .......................................................... 703/6

See application file for complete search history.

(56) References Cited

U.S. PATENT DOCUMENTS

| | | |
|---|---|---|
| 2012/0232861 A1 | 9/2012 | Lu et al. |
| 2013/0118736 A1 | 5/2013 | Usadi et al. |
| 2015/0134314 A1 | 5/2015 | Lu et al. |
| 2019/0093469 A1 | 3/2019 | Williams et al. |

OTHER PUBLICATIONS

Greenfeld_2019 (Learning to Optimize Multigrid PDE Solvers, Proceedings fo the 36th International Conference on Machine Learning, Long Beach, California, PMLR 97, 2019) (Year: 2019).*

Gasparo_2000 (Inexact Methods: Forcing Terms and Conditioning, Journal of Optimization Theory and Applications: vol. 107, No. 3, pp. 573-589 Dec. 2000) (Year: 2000).*

Zhang_2017 "Machine Learning Involvement in Reservoir Simulation by Optimizing Algorithms in SAGD and SA-SAGD Processes." PhD diss., MS Thesis, University of Calgary, Calgary, AB. https://doi. org/10.11575/PRISM/26806, 2017. (Year: 2017) (Year: 2017).*

Roosta-Khorasani_2016 "Sub-sampled Newton methods I: globally convergent algorithms." arXiv preprint arXiv:1601.04737 (2016). (Year: 2016) (Year: 2016).*

Saad et al., "GMRES: A generalized minimal residual algorithm for solving nonsymmetric linear systems", SIAM J. Sci. Stat. Comput., 7:856-869, 1986.

Eisenstat et al., "Globally convergent inexact newton methods", SIAM Journal on Optimization, 4 (1994), pp. 393-422.

An et al., "A choice of forcing terms in inexact newton method", Journal of Computational and Applied Mathematics, 200 (2007), pp. 47-60.

Search Report and Written Opinion of International Patent Application No. PCT/US2021/013859 on May 4, 2021; 9 pages.

Botti, "A choice of forcing terms in inexact Newton iterations with applications to pseudo-transient continuation for incompressible fluid flow computations", Applied Mathematics and Computation, 266 (2015), pp. 713-737.

Christie et al., "Tenth SPE Comparative Solution Project: A Comparison of Upscaling Techniques", Society of Petroleum Engineers, Aug. 2001 SPE Reservoir Evaluation & Engineering, pp. 308-317.

Aziz and Settari, Petroleum Reservoir Simulation, Elsevier Applied Science Publishers, London, 1979.

Sheth et al., "Inexact Newton Method for General Purpose Reservoir Simulation", Cornell University, pp. 1-23, Dec. 13, 2019. <https://arxiv.org/abs/1912.06568v1> pp. 1-21.

Dembo et al., "Inexact Newton Methods", SIAM Journal on Numerical Analysis, 19 (1982), pp. 400-408.

Extended Search Report issued in European Patent Application No. 21743696.3 dated Jan. 4, 2024, 9 pages.

Zhang, Y., Machine Learning Involvement in Reservoir Simulation by Optimizing Algorithms in SAGD and SA-SAGD Processes, 2017, Retrieved from the Internet: [URL:https://prism.ucalgary.ca/bitstream/11023/3757/1/ucalgary_2017_zhang_yu.pdf], 63 pages.

* cited by examiner

METHODS AND SYSTEMS FOR RESERVOIR SIMULATION

CROSS-REFERENCE TO RELATED APPLICATION(S)

The present disclosure is a National Stage Entry of International Application No. PCT/US2021/013859, filed Jan. 19, 2021, which claims priority from U.S. Provisional Patent Appl. No. 62/963,522, filed on Jan. 20, 2020, herein incorporated by reference in its entirety.

FIELD

This disclosure relates to the hydrocarbon industry and petroleum reservoir engineering. In particular, this disclosure relates to methods and systems for simulating fluid flow in a reservoir and possibly connected wellbore(s).

BACKGROUND

In order to maximize the return on investment in exploiting a subterranean hydrocarbon reservoir, information regarding the spatial distribution of reservoir fluid properties over the volume of the reservoir, information regarding a completion and associated wellbore that traverses the reservoir can be obtained by various means, and such information can be fed to a reservoir simulator which models and predicts the multi-phase fluid flow between the reservoir and the wellbore and through the wellbore over time. By way of example, reservoir fluid properties may include volume fractions or mass fractions of constituent gaseous and liquid hydrocarbon components and water, viscosity and fluid density of these components, and reservoir pressure and reservoir temperature. Also, by way of example, the information fed to the reservoir simulator may include information describing the number and location of connections between the reservoir and the wellbore, information describing location and operation of flow control devices, such as chokes and valves, labyrinth devices, and downhole separators, between the reservoir and the wellbore, and information describing the geometry of the wellbore. One function of the reservoir simulator is to help determine completion strategies and associated parameters (e.g., locations and settings of flow control valves, production pressure, etc.) that will help maximize/optimize the production of hydrocarbon fluids from the reservoir. See, e.g., co-owned U.S. Pat. No. 9,816,353 to Rashid et al., and co-owned U.S. Pat. No. 9,708,899 to Prange et al., both of which are hereby incorporated by reference herein in their entireties. Real-world implications of properly and optimally completing and exploiting a hydrocarbon reservoir can amount in the differences of hundreds of millions of dollars of revenue.

Reservoir simulators (as well as other numerical simulators) model the evolution of state variables over time and space. The equations that govern these variables are often highly nonlinear and exhibit significant complexity. Due to the lack of closed form analytical solutions, nonlinear fixed-point iterative methods are required to solve these problems. The most widely used method is the Newton's method. This iterative method starts with an initial guess of the state of the system and works by taking finite steps along the direction of the solution. The computation of the direction and the step length involve the solution of a linear system. The linear systems can vary in size depending on the problem ranging from a few hundred for a laminar pipe flow to millions for real-life oil reservoir models. In order to solve these linear systems efficiently, one requires an iterative linear solver such as Generalized Minimal Residual method (GMRES), proposed by Saad. See Saad et al., "GMRES: "A generalized minimal residual algorithm for solving nonsymmetric linear systems", SIAM J. Sci. Stat. Comput., 7:856-869, 1986. doi:10.1137/0907058. The linear solver alone takes up to 30-70% of the total simulation time inverting and solving a matrix-vector system, and any improvement in the linear solver directly results in computational gains. There are two major ways of improving the performance of any simulation—hardware improvement and advanced algorithm. Algorithmic changes tend to focus on reducing the number of iterations to achieve an acceptable solution to the problem.

One of the challenges of using an iterative linear solver is the stopping criteria or convergeance criterion that is used to determine that the most-recent iteration of the linear solver has achieved an acceptable solution. A tighter convergence criteria ensures a good linear solution but might not affect the quality of the nonlinear solution update in the linear solver. This results in a phenomenon called oversolving of the Newton equation. If the current state variables are far away from the solution, an accurate solution of the linear system might not be required. Eisenstat proposed a variable tolerance method that selects a relative linear convergence tolerance based on the nonlinear state of the system. See Eisenstat et al., "Globally convergent inexact newton methods", SIAM Journal on Optimization, 4 (1994), pp. 393-422, https://doi.org/10.1137/0804022, hereinafter Eisenstat. Oversolving is shown in the FIG. 1. The line with circle markers show the nonlinear residual norm computed at each linear iteration and the line with square markers depict the linear residual norm. Solving the linear system to a tight tolerance does not guarantee the nonlinear residual norm to decay—especially in the first few Newton iterations.

On the other hand, FIG. 2 shows the result of using a variable linear tolerance as a function of the nonlinear state of the system. This FIG. 2 clearly shows that restricting the linear convergence tolerance with increasing Newton iterations reduces the problem of oversolving. After the seminal work of Eisenstat, many researchers presented different methods of selecting the linear convergence tolerance for a given problem. See An et al., "A choice of forcing terms in inexact newton method", Journal of Computational and Applied Mathematics, 200 (2007), pp. 47-6 and Botti, "A choice of forcing terms in inexact newton iterations with application to pseudo-transient continuation for incompressible fluid flow computations", Applied Mathematics and Computation, 266 (2015), pp. 713-737.

A known issue with these methods is that by decreasing the number of linear iterations (reducing oversolving), most often, the number of nonlinear iterations increase to an extent, which can become a limitation for the performance improvement achieved through the decrease in the linear iterations.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The present disclosure describes an improved reservoir simulator that is configured to determine variable convergence criteria used in the newton iterations in a manner that addresses the problem of oversolving while minimizing the adverse effect on the nonlinear system. In the improved reservoir simulator, nonlinear information along with some information from the linear system can be used to determine a variable convergence tolerance. The variable convergeance tolerance can be used to define the variable convergence criteria used in the newton iterations.

In embodiments, the information from the linear system that is employed to determine the variable convergence tolerance can include data representing approximate condition number determined from information from the previous newton iteration, such as from the maximum and minimum eigenvalues of the linear system from the previous newton iteration.

In embodiments, the variable convergence tolerance can be determined by operation of a machine learning system.

In embodiments, the newton iterations include a current newton iteration following a previous newton iteration. The machine learning system can be configured to take as input nonlinear system information related to the current newton iteration and linear system information related to the previous newton iteration to determine a variable convergence tolerance used to solve the current newton iteration.

In embodiments, the newton iterations include a current newton iteration following a previous newton iteration. The machine learning system can be configured to take as input data representing a number of features related to current newton iteration and the previous newton iteration to determine a variable convergence tolerance used to solve the current newton iteration. For example, the features can include linear system information related to the previous newton iteration selected from the group consisting of: data representing approximate condition number from the previous newton iteration, and data representing number of linear iterations for the previous newton iteration. In another example, the features can include nonlinear system information related to the current newton iteration selected from the group consisting of: data representing a residual 2-norm, and data representing decay in the residual 2-norm. In still another example, the features can include data representing current newton iteration number or data representing current time-step size.

In embodiments, the machine learning system can be configured to employ a random forest regression.

In embodiments, the newton iterations include a current newton iteration following a sequence of previous newton iterations. The machine learning system can be embodied by a Recurrent Neural Network that is configured to take information from the sequence of previous newton iterations as input to output a variable convergence tolerance that is used to solve the current newton iteration.

In other embodiments, the variable convergence criterion can be further determined from a heuristic $\eta'$ of the form $$\eta' = \alpha\left(\frac{\|R\|_2^\nu}{\|R\|_2^{\nu-1}}\right)^{\beta+\gamma} \frac{1}{\left(\frac{|\lambda_{max}|^{\nu-1}}{|\lambda_{min}|}\right)^\delta},$$

where $\alpha, \beta, \gamma, \delta$ are fixed parameters, $$\|R\|_2^\nu$$

represents representing a residual 2-norm for the current newton iteration, $$\|R\|_2^{\nu-1}$$

represents representing a residual 2-norm for the previous newton iteration, and $$\frac{|\lambda_{max}|^{\nu-1}}{|\lambda_{min}|}$$

represents the ratio of the maximum and minimum eigenvalues of the linear system for the previous newton iteration.

In embodiments, the results generated by the reservoir simulator can be used to aid in determining completion strategies and associated parameters (e.g., locations and settings of flow control valves, production pressure, etc.) that will help maximize/optimize the production of hydrocarbon fluids from the reservoir. For example, if the solution of the reservoir-wellbore model is deemed suitable and the wellbore(s) is/are not yet drilled, the formation may then be drilled, valves located, and valve and pressure parameters for production of hydrocarbons set according to the solution, and hydrocarbons may be produced from the completion. Where the wellbores are in place, the wellbores may be completed according to the solution (e.g., valves placed and valve and pressure parameters set) and hydrocarbons may be produced from the completion.

In other aspects, processor-based systems and computer readable media can embody the reservoir simulator as described and claimed.

BRIEF DESCRIPTION OF DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

Figure 1:
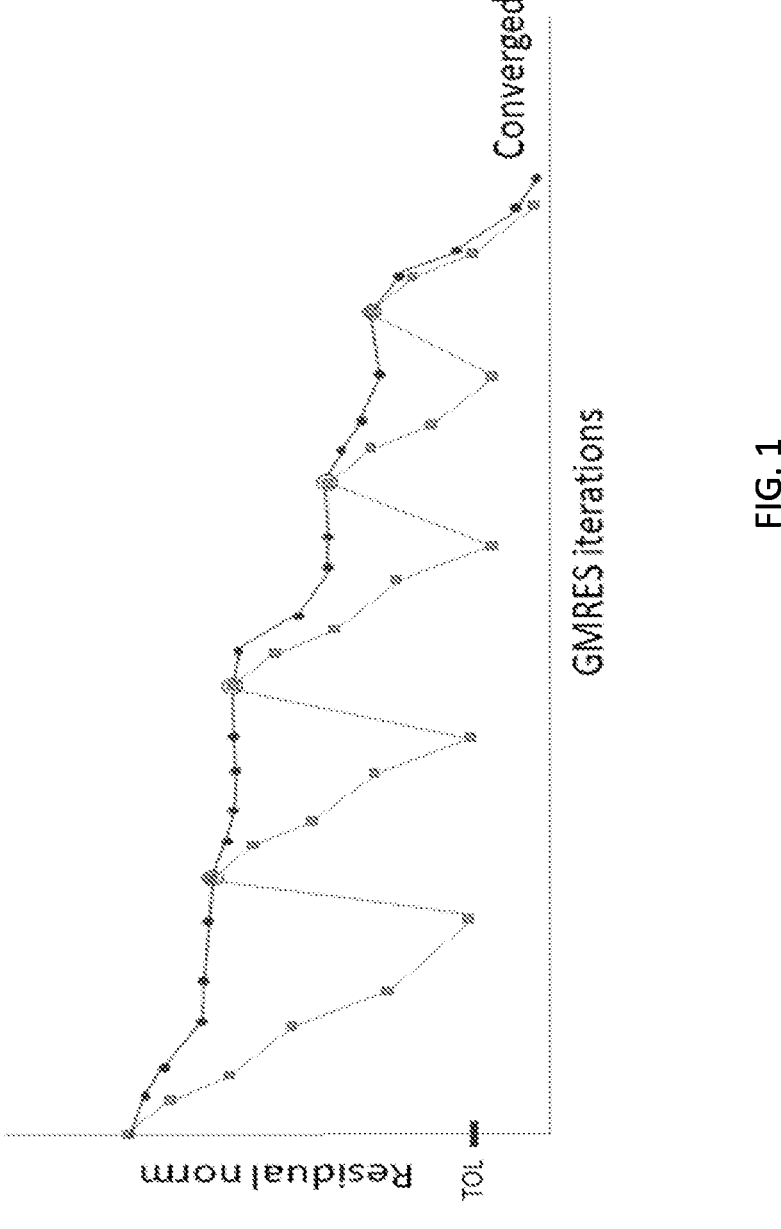
FIG. 1 is a plot illustrating oversolving of the Newton equation in a reservoir simulator.
Figure 2:
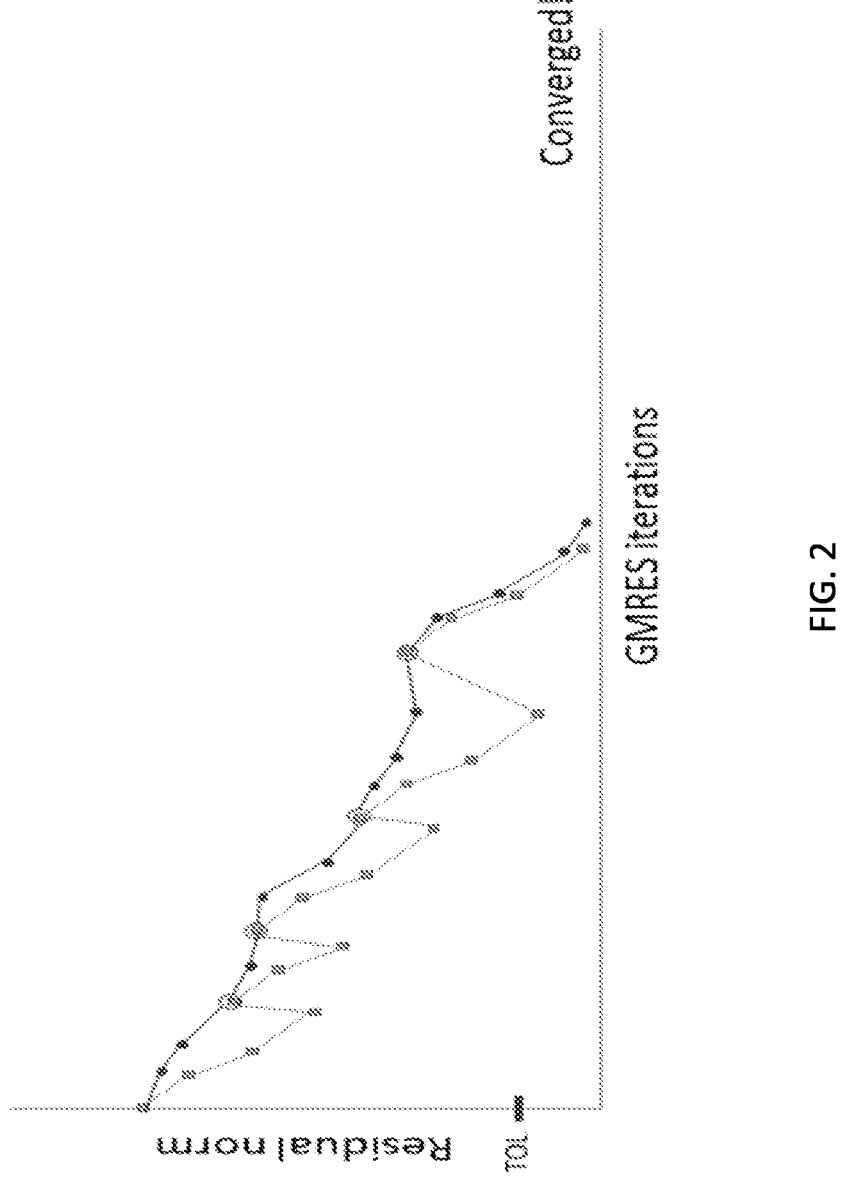
FIG. 2 is a plot illustrating variable relative linear convergence tolerance for solving Newton equations in a reservoir simulator.
Figure 3:
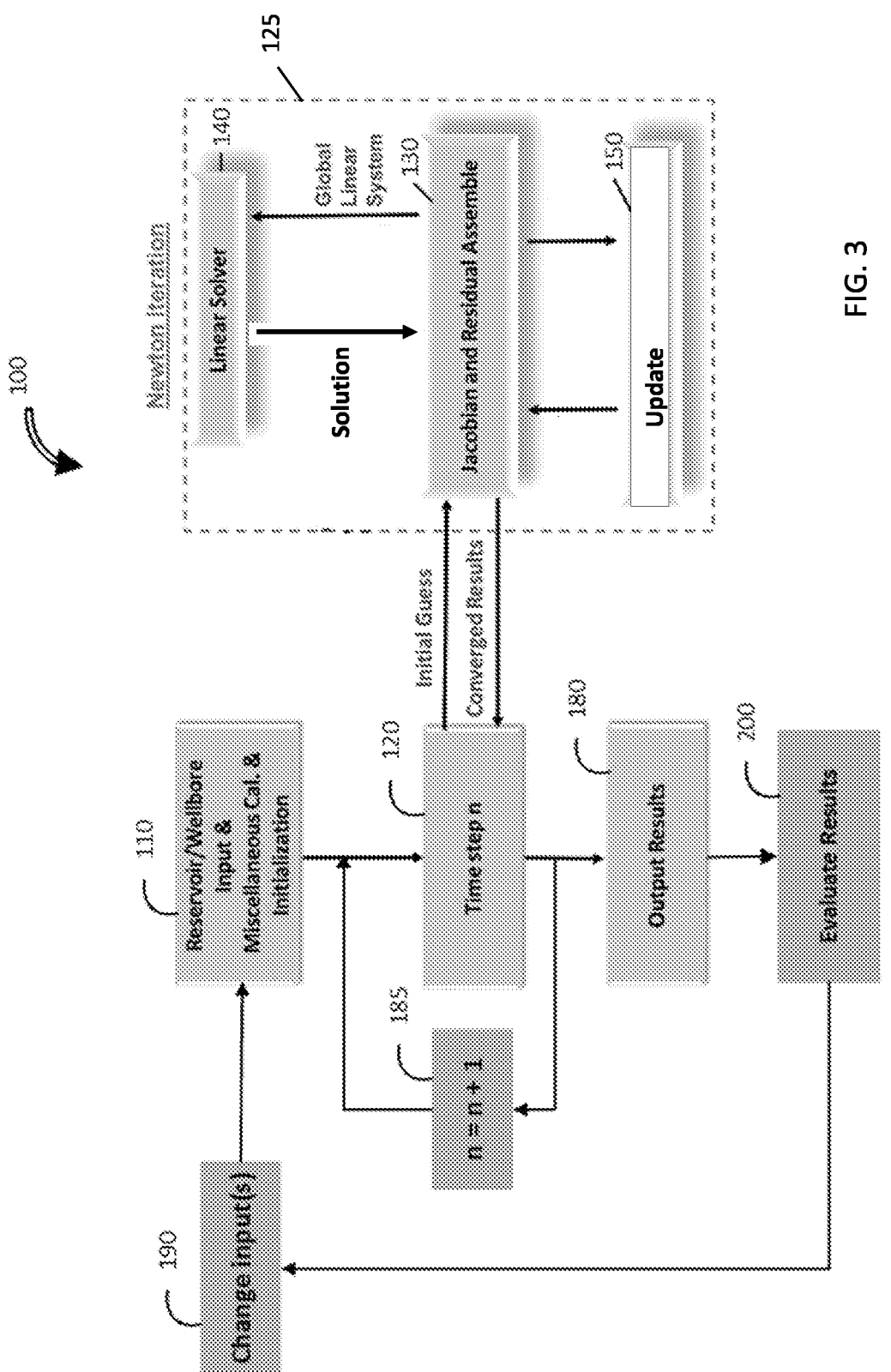
FIG. 3 is a high-level schematic diagram of a reservoir simulator and its operation.

Turning to FIG. 3, a high level schematic diagram is provided of a reservoir simulator 100 and methods for optimizing hydrocarbon production from subterranean hydrocarbon reservoirs. The reservoir simulator 100 is a processor-based system that employs a discretized form of a set of partial differential equations to model multi-phase, multiple component fluid flow in natural porous media through the reservoir and the connected wellbore(s). The governing equations typically used to describe the fluid flow are based on the assumption of thermodynamic equilibrium and the principles of conservation of mass, momentum and energy, as described in Aziz, K. and Settari, A., Petroleum Reservoir Simulation, Elsevier Applied Science Publishers, London, 1979. The complexity of the physics that govern reservoir fluid flow leads to systems of coupled nonlinear partial differential equations that are not amenable to conventional analytical methods. As a result, numerical solution techniques are necessary. The numerical solution techniques divide the reservoir into computational elements (e.g., cells or grid blocks) that cover the spatial extent of the reservoir, and divide time into time intervals or time steps (e.g., days or months). At each time step, the coupled system of nonlinear equations is solved using Newton's method, which is an iterative method where the approximate solution to the nonlinear system is obtained by an iterative process of linearization, linear system solution and updating.

The simulator 100 incorporates a reservoir-wellbore model, which is a set of partial differential equations which govern multi-phase, multiple component fluid flow through the reservoir and the connected wellbore(s). The underlying partial differential equations are discretized on computational elements (e.g., grid cells or grid blocks) that cover the spatial extent of the reservoir, one or more wellbore(s) with production tubing and possibly other equipment that extend through the reservoir, and the connections between the reservoir rock and the wellbore(s). State variables are defined for the computational elements (e.g., grid cells or grid blocks) of the reservoir, the completion, and the connections between the reservoir rock and the completion.

At 110, information regarding the reservoir and the wellbore(s) with production tubing and possibly other equipment that extend through the reservoir is input into the reservoir simulator 100. Such information can include initial distributions of reservoir fluid properties such as volume fractions or mass fractions of constituent gaseous and liquid hydrocarbon components and water, viscosity and fluid density of these components, and reservoir pressure and reservoir temperature. Also, by way of example, the information fed to the simulator may include information describing the number and location of connections between the reservoir and the wellbore, information describing location and operation of flow control devices (if installed), such as chokes and valves, labyrinth devices, and downhole separators, and information describing the geometry of the wellbore.

After parsing the information input in 110, the reservoir simulator solves the reservoir-wellbore model for a time step n at 120. In order to approximate a solution to the discretized partial differential equations of the reservoir-wellbore model using Newton's method, a Jacobian matrix (which is part of the Jacobian and Residual Assembly 130) is constructed for the discretized partial differential equations of reservoir-wellbore model. Initial guesses (values) for the state variables (which may have been provided to the model as inputs at 110 for the initial time step) are fed into a program that conducts a Newton Iteration 125 to solve for the reservoir-wellbore model at time step n. As part of the Newton Iteration 125, the linear solver can apply the GMRES method to the Jacobian and Residual Assembly 130 to solve the linear system and then check whether the solution satisfies a variable convergence criteria. Block 150 can apply a non-linear update to the linear system for another Newton Iteration. In this manner, the reservoir simulator can operate over a sequence of newton iterations where the most recent newton iteration is referred to as the current newton iteration. The current newton iteration follows the immediately preceding newton iteration, which is referred to as the previous newton iteration. The newton iterations of the sequence can be assigned numbers or identifiers. For example, a sequence of three newton iterations can include newton iterations 1, 2, 3 where "3" is the number/identifier for current newton iteration and "2" is the number/identifier for the previous newton iteration. If and when the variable convergence criteria is satisfied, the results for time step n are provided as output results at 180. The operations may then continue by stepping through time (n=n+1) at 185 and running the Newton Iteration 125 for the next time step. Eventually, the results for all times of interest are evaluated at 200.

In 200, the results generated by the reservoir simulator can be used to aid in determining completion strategies and associated parameters (e.g., locations and settings of flow control valves, production pressure, etc.) that will help maximize/optimize the production of hydrocarbon fluids from the reservoir. For example, if the solution of the reservoir-wellbore model is deemed suitable and the wellbore(s) is/are not yet drilled, the formation may then be drilled, valves located, and valve and pressure parameters for production of hydrocarbons set according to the solution, and hydrocarbons may be produced from the completion. Where the wellbores are in place, the wellbores may be completed according to the solution (e.g., valves placed and valve and pressure parameters set) and hydrocarbons may be produced from the completion.

In accordance with the present disclosure, the reservoir simulator can be configured to determine the variable convergence criteria used in the Newton iterations (e.g., Newton Iteration 125) in a manner that addresses the problem of oversolving while minimizing the adverse effect on the nonlinear system. The proposed method can also be applied to other applications without any restrictions. In the proposed method, nonlinear information along with some information from the linear system can be used to determine a variable convergence tolerance. The variable convergeance tolerance is used to define the variable convergence criteria used in the Newton iterations (e.g., Newton Iteration 125). This has never been done before due to the fact that all the linear information is available only after we solve the linear system and the selection of the linear convergence tolerance is a-priori process. In theory, an important factor that affects the linear solver is the condition number of the linear system. This is very expensive to compute for the entire Jacobian matrix and hence is impractical for reservoir simulation applications. Instead, the proposed method relies on extracting an approximate condition number from the iterative linear solver at no cost. This approximate condition number can give valuable information for the following nonlinear iterations. In embodiments, the approximate condition number can be determined from information from the previous Newton iteration, such as from the maximum and minimum eigenvalues $\lambda_{max}$, $\lambda_{min}$ of the linear system from the previous Newton iteration as set forth in Table A below.

Figure 4:
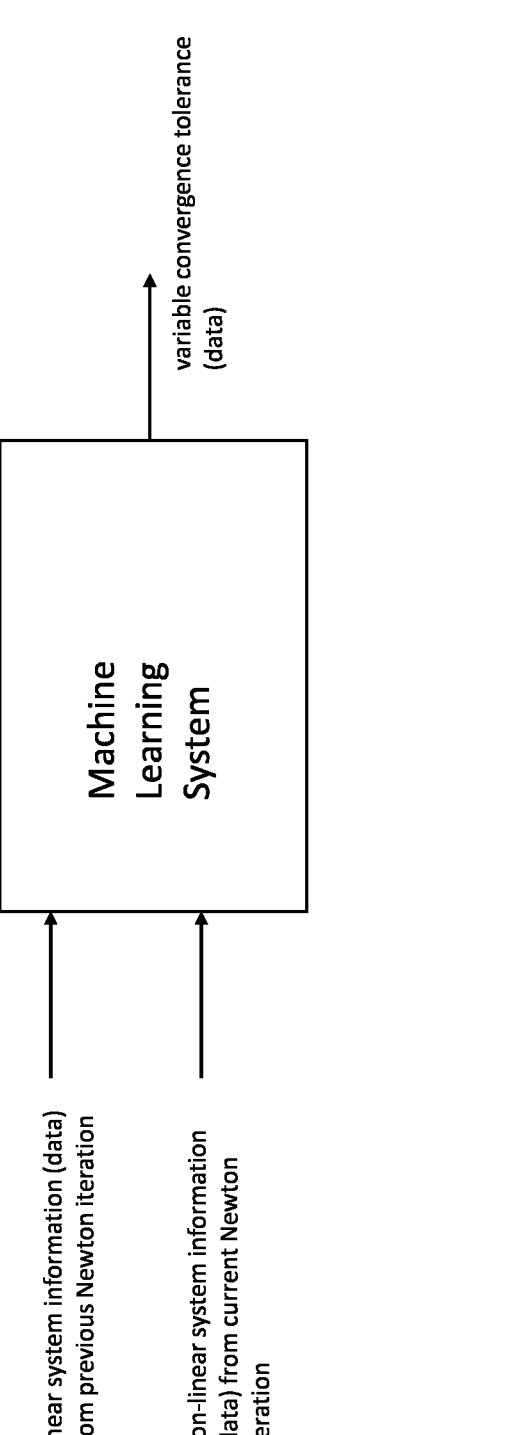
FIG. 4 is a high-level schematic diagram of a machine learning system configured to output a variable convergence tolerance, which can be employed to define variable convergence criteria used in the Newton iterations performed by a reservoir simulator.

In most cases, the first Newton iteration exhibits the highest (worst) condition number. To understand the effect of the condition number and the number of linear iterations to solve the previous newton iterations, a machine learning system can be implemented and trained to take as input nonlinear system information (from the current state, i.e., current newton iteration) as well as linear system information (from the previous state, i.e, previous newton iteration) to predict a variable convergence tolerance as output. The variable convergence tolerance output by the machine learning system can be used to define the variable convergence criteria used to solve the linear system at the current newton iteration. An example machine learning system is illustrated in FIG. 4.

Figure 5:
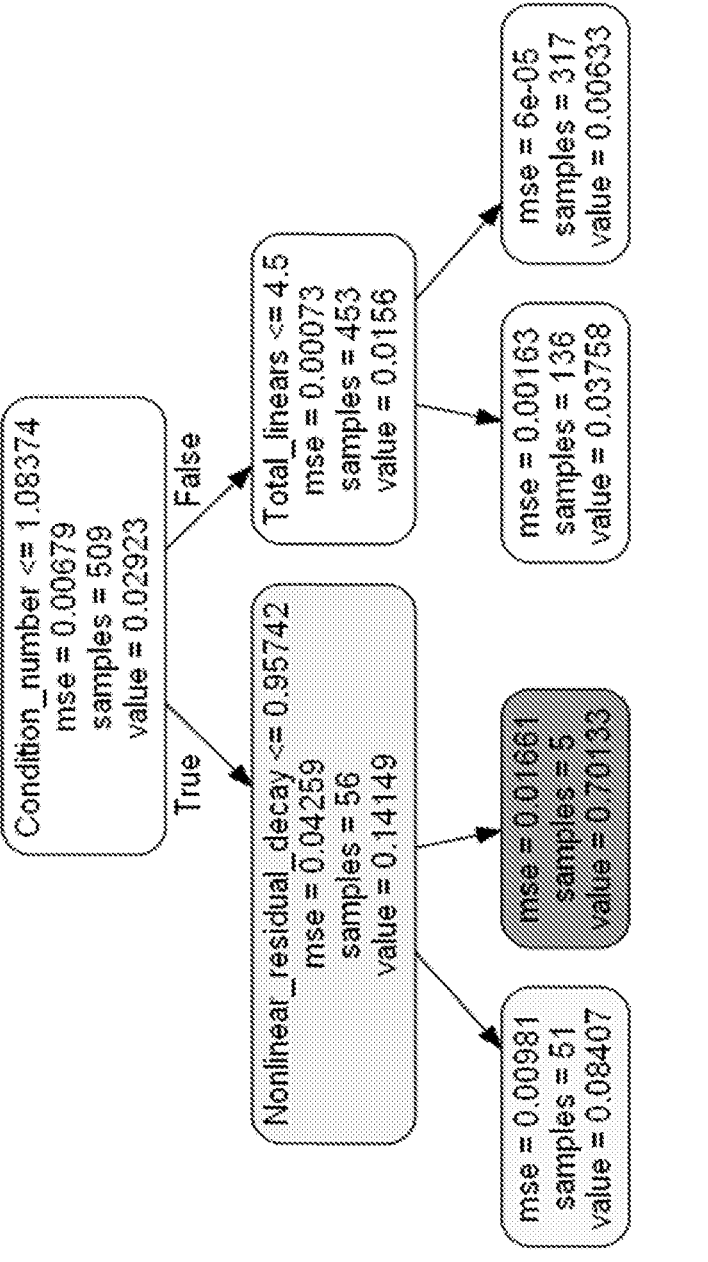
FIG. 5 is a diagram of a snapshot of a tree from the Random Forest regression; this figure shows the importance of the condition number from the previous iteration on the prediction of the linear convergence tolerance for the following iteration.
Figure 6:
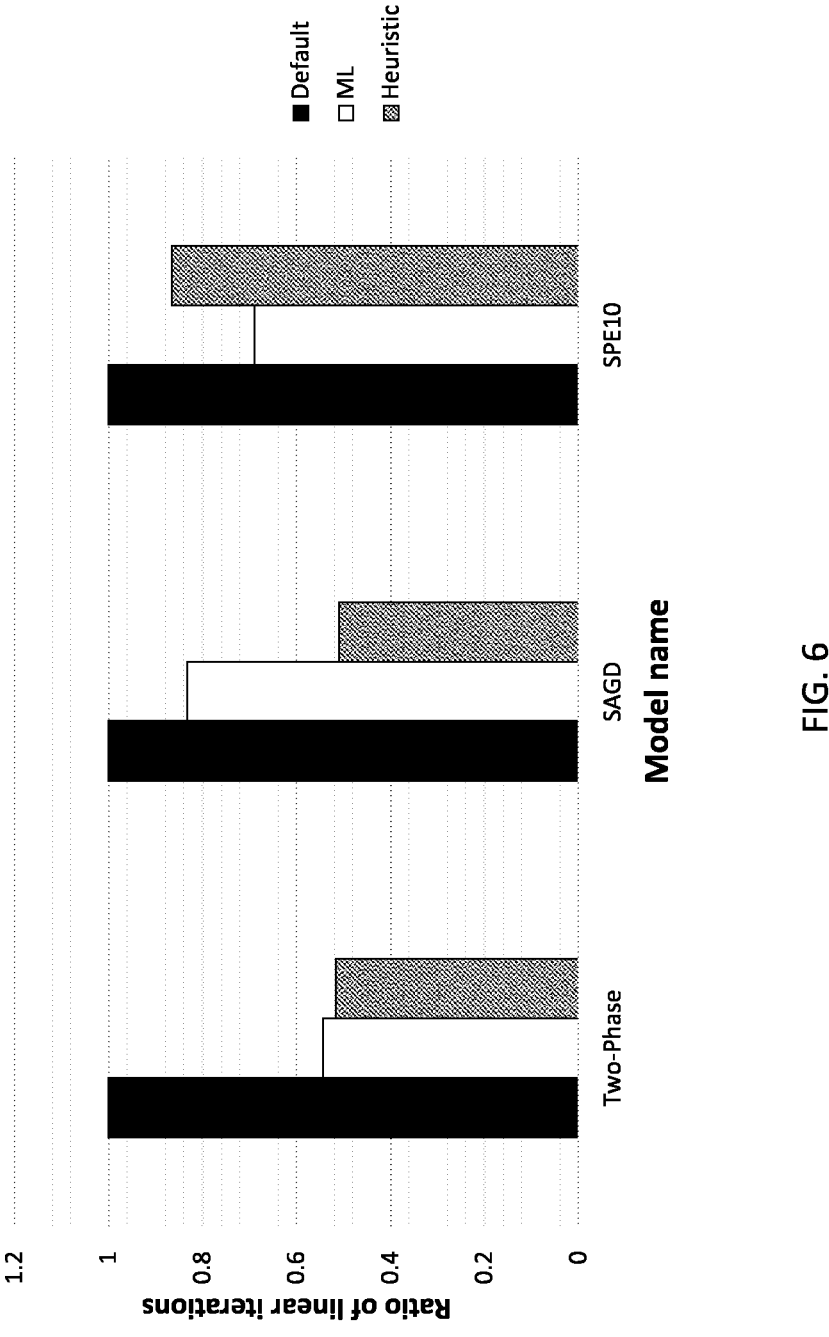
FIG. 6 is a plot illustrating the number of linear iterations performed by three different reservoir simulators including a default simulator, a simulator using the machine learning system as described herein, and a simulator using the new heuristics as described herein. The plots cover isothermal and thermal cases, including a simple two-phase model, an industry benchmark given in Christie et al., "Tenth SPE Comparative Solution Project: A Comparison of Upscaling Techniques", Society of Petroleum Engineers, hereinafter Christie, and a thermal steam-assisted gravity drainage (SAGD) problem.

In embodiments, the machine learning system can employ random forest regression due to its simplicity of implementation and convenient interpretation of the features used. A very small part from an example random forest machine learning system is shown in FIG. 5, which shows the importance of condition number followed by the nonlinear residual norm. This proves the importance of linear information for such applications.

Along with the condition number, the proposed method can employ a set of features that can provide improved results. These features can be extracted from the reservoir simulation and used to train the machine learning system to predict the linear convergence tolerance which is then used to solve the linear system at the current newton iteration. The set of features can include data values representing the features provided in Table A below:

TABLE A

| Features | Description |
| --- | --- |
| $\|R\|_2^v$ | Residual 2-norm of the nonlinear system |
| $\dfrac{\|R\|_2^v}{\|R\|_2^{v-1}}$ | Decay in the residual 2-norm of the nonlinear system |
| v | Current Newton iteration number |
| Δt | Current time-step size |
| $\phi^{v-1}$ | Number of linear iterations for the previous Newton iteration |

TABLE A-continued

| Features | Description |
| --- | --- |
| $\dfrac{\|\lambda_{max}\|^{v-1}}{\|\lambda_{min}\|}$ | Approximate condition number from the previous Newton iteration |

Along with the machine-learning system, the reservoir simulator can employ a heuristic which extends the estimate proposed by Eisenstat. See Eisenstat. The original estimate is given as:

$$\eta = \alpha \left( \frac{\|R\|_2^v}{\|R\|_2^{v-1}} \right)^{\beta}, \qquad \text{Eqn. (1)}$$

where $\alpha \in (0,1)$ and $\beta \in (0,1)$. The value for suggested by the authors was 1.618, which is the convergence rate of a secant method. In embodiments, the reservoir simulator can employ a new estimate or heuristic that uses the system information of Table A and is given as:

$$\eta' = \alpha \left( \frac{\|R\|_2^v}{\|R\|_2^{v-1}} \right)^{\beta+\gamma} \frac{1}{\left( \frac{\|\lambda_{max}\|^{v-1}}{\|\lambda_{min}\|} \right)^{\delta}}, \qquad \text{Eqn. (2)}$$

where $\alpha$, $\beta$, $\gamma$, $\delta$ are fixed parameters, $$\|R\|_2^v$$

represents representing a residual 2-norm for the current newton iteration, $$\|R\|_2^{v-1}$$

represents representing a residual 2-norm for the previous newton iteration, and $$\frac{\|\lambda_{max}\|^{v-1}}{\|\lambda_{min}\|}$$

represents the ratio of the maximum and minimum eigenvalues of the linear system for the previous newton iteration. The new estimate or heuristic $\eta'$ can be employed to define the variable convergence criteria used to solve the linear system at the current newton iteration (e.g., Newton Iteration 125).

The machine-learning system and the new heuristic $\eta$ has been run for various practical reservoir simulation cases within Schlumberger's commercial reservoir simulator and the results are shown in FIG. 5. The results are shown for a simple two-phase model, an industry benchmark given in Christie and a thermal steam-assisted gravity drainage (SAGD) problem. In all of these cases, the simulator achieves good performance improvement compared to the industry standard default setting.

Table B below shows the number of linear and nonlinear iterations for the industry benchmark and the SAGD case. It is worth noting that the number of linear iterations reduces in both the machine-learning model application and the heuristic method. The machine-learning model was successful in keeping the number of Newton iterations contained and resulted in a good balance between the linear and nonlinear improvements. On the other hand, the heuristic method resulted in a slight increase in the Newton iterations for the SAGD case while reducing the linear iterations to a huge extent. This requires further tuning and improved results are expected.

TABLE B

Simulation results including the number of nonlinear iterations
for the industry benchmark and the SAGD case.

| Simulation model | Method | Total number of time steps | Non-linear iterations | Linear iterations |
|---|---|---|---|---|
| Industry Benchmark | Default | 280 | 928 | 8989 |
| | ML | 273 | 938 | 6198 |
| | Heuristic | 281 | 936 | 7776 |
| SAGD | Default | 218 | 881 | 4616 |
| | ML | 218 | 881 | 3843 |
| | Heuristic | 224 | 946 | 2352 |

This shows that the machine learning system and in general the amount of data that is available within the simulator has a huge value towards performance studies.

Along with application in reservoir simulation, similar methods can be applied to any implicit time-stepping simulator that uses iterative linear solvers.

In other embodiments, additional features can be used to guide the machine learning system in the right direction and provide an improved estimate for the variable convergence criteria. For example, a Recurrent Neural Network can also be employed which will take the information from a sequence of previous Newton iterations as input and learn from the time-series input to output an estimate for a variable convergence tolerance that is used to solve the current Newton iteration.

Figure 7:
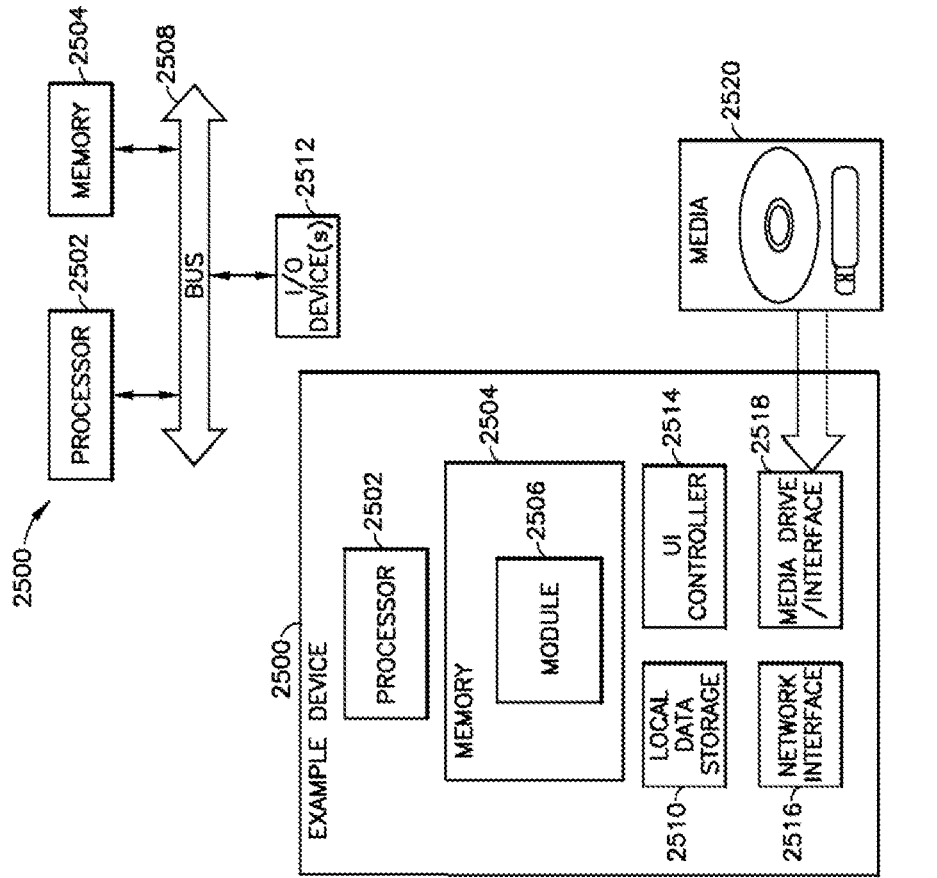
FIG. 7 is a block diagram of a computer processing system.

FIG. 7 illustrates an example device 2500, with a processor 2502 and memory 2504 that can be configured to implement various embodiments of the reservoir simulator as discussed in this disclosure. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of computers, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500, and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer. Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general-purpose computer) for executing any of the methods and processes described above.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory) and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses, if any, are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

The invention claimed is:

1. A method of simulating fluid flow within a subterranean reservoir and optionally within at least one wellbore connected thereto, comprising:

gathering information regarding the reservoir and optionally the at least one wellbore connected thereto;

providing the information to a reservoir simulator and running the reservoir simulator to generate a solution that models fluid flow within the reservoir and optionally within the at least one wellbore connected thereto wherein the reservoir simulator performs a number of newton iterations to generate the solution and employs a variable convergence criterion determined by operation of a machine learning system; wherein the variable convergence criterion is a forcing term of an inexact Newton method; and setting a flow control valve based on the solution.

2. A method according to claim 1, wherein the newton iterations include a current newton iteration following a previous newton iteration; and the machine learning system takes as input nonlinear system information related to the current newton iteration and linear system information related to the previous newton iteration to determine a variable convergence tolerance used to solve the current newton iteration.

3. A method according to claim 1, wherein the newton iterations include a current newton iteration following a previous newton iteration; and the machine learning system takes as input data representing a number of features related to current newton iteration and the previous newton iteration to determine a variable convergence tolerance used to solve the current newton iteration.

4. A method according to claim 3, wherein the features comprise linear system information related to the previous newton iteration selected from the group consisting of: data representing approximate condition number from the previous newton iteration, and data representing number of linear iterations for the previous newton iteration.

5. A method according to claim 3, wherein the features comprise nonlinear system information related to the current newton iteration selected from the group consisting of: data representing a residual 2-norm, and data representing decay in the residual 2-norm.

6. A method according to claim 3, wherein the features comprise data representing current newton iteration number.

7. A method according to claim 3, wherein the features comprise data representing current time-step size.

8. A method according to claim 1, wherein the machine learning system employs a random forest regression.

9. A method according to claim 1, wherein the newton iterations include a current newton iteration following a sequence of previous newton iterations; and the machine learning system comprises a Recurrent Neural Network that is configured to take information from the sequence of previous newton iterations as input to output a variable convergence tolerance that is used to solve the current newton iteration.

10. A method according to claim 1, wherein the variable convergence criterion is further determined from a heuristic $\eta'$ of the form $$\eta' = \alpha \left( \frac{\|R\|_2^{\nu}}{\|R\|_2^{\nu-1}} \right)^{\beta+\gamma} \frac{1}{\left( \frac{|\lambda_{max}|^{\nu-1}}{|\lambda_{min}|} \right)^{\delta}},$$

where $\alpha$, $\beta$, $\gamma$, $\delta$ are fixed parameters, $$\|R\|_2^{\nu}$$

represents representing a residual 2-norm for the current newton iteration, $$\|R\|_2^{\nu-1}$$

represents representing a residual 2-norm for the previous newton iteration; and $$\frac{|\lambda_{max}|^{\nu-1}}{|\lambda_{min}|}$$

represents the ratio of the maximum and minimum eigen-values of the linear system for the previous newton iteration.

11. A processor-based system that stores program instructions that, when executed on the system, cause the system to perform the method of claim 1.

12. A non-transitory computer-readable medium storing program instructions that, when executed by a processor, cause the processor to perform the method of claim 1.

\* \* \* \* \*